United States Patent [19]

Mercer

[11] 4,174,416
[45] Nov. 13, 1979

[54] TUBULAR PLASTICS MATERIAL NET HAVING CORRUGATIONS

[75] Inventor: Frank B. Mercer, Blackburn, England

[73] Assignee: Netlon Limited, Lancashire, England

[21] Appl. No.: 860,324

[22] Filed: Dec. 14, 1977

[30] Foreign Application Priority Data

Dec. 14, 1976 [GB] United Kingdom ............... 52145/76
Mar. 22, 1977 [GB] United Kingdom ............... 11950/77

[51] Int. Cl.² .............................................. B32B 5/12
[52] U.S. Cl. ........................... 428/107; 264/DIG. 81;
264/167; 264/168; 264/286; 264/235; 428/36;
428/108; 428/182; 428/255; 428/910
[58] Field of Search ............... 264/DIG. 47, DIG. 81,
264/167, 168, 286, 289; 428/36, 107, 182, 188,
255, 910, 108

[56] References Cited

U.S. PATENT DOCUMENTS

| 3,370,116 | 2/1968 | Wrede | 264/210 R |
| 3,692,889 | 9/1972 | Hetrich | 264/167 |
| 4,020,208 | 4/1977 | Mercer et al. | 428/36 |

Primary Examiner—James J. Bell
Attorney, Agent, or Firm—Holman & Stern

[57] ABSTRACT

Process and apparatus for treating tubular, plastics material net comprising transversely opening out a rope-oriented net, transversely corrugating the transversely opened-out net, and heat setting the net in its transversely opened-out and corrugated state. In addition, the product thereof, having a length less than 1/350th of the maximum axially-extended length of the net.

8 Claims, 7 Drawing Figures

TUBULAR PLASTICS MATERIAL NET HAVING CORRUGATIONS

BACKGROUND OF THE INVENTION

The present invention relates to a process and apparatus for treating tubular, plastics material net of the type which has been formed by rope-orientating a mesh structure comprising two sets of strands joined together by tenacious intersections, each set extending at an angle to the other set and at an oblique angle to the machine and transverse directions. The invention also relates to net treated in accordance with the process.

One particular application for nets of said type is in the production of tubular packages as used extensively for example in packaging commodities such as agricultural or horticultural produce. In utilizing tubular, plastics material netting in such applications, it has become common practice to form the net tube into discrete packaging "sleeves" each comprising a relatively long length of the tubular net which has been axially bunched. In use, a sleeve is placed over the hollow feed tube of a packaging machine and gradually payed off to form individual packages which receive commodities from the interior of the feed tube. It is clear that the more concentrated the bunching of the tubular net in the packaging sleeve, the greater is the length of netting which can be accommodated on a feed tube of a given length and the longer is the operative packaging time available between sleeve replacements. Accordingly it is desirable in a packaging sleeve for the sleeve material to be concentrated into as short a length as possible.

In one well known kind of plastics material net of said type, the two sets of strands lie in adjacent planes (i.e. bi-planar), the intersections (which may be referred to as junctions) being produced either as confluent, integral (i.e. unbonded) intersections formed before or as the net strands are extruded or may become confluent by adhesive bonding of one extruded strand to another where they cross in contact, the adhesive bond being tenacious due to there being an adequate area of contact between the strands to prevent one strand being torn or stripped from the other under stresses applied to either strand or both for the purpose of stretching and molecularly orientating the plastics material of which the net is composed. in each case, the strands are on casting continuous throughout the net.

It is convenient when extruding such nets to utilize a process and apparatus of the type disclosed in U.K. Patent Specification No. 836,555 in which the net is extruded from a relatively rotating concentric pair of circular dies each having a circular series of spaced extrusions die orifices, the tubular cast product having confluent, integral intersections with the net strands being diversions of the intersections and each set of net strands extending helically of the tubular product so that a diamond-shaped net is produced with each net opening having one diagonal extending in the direction of extrusion (machine direction or MD) and the other diagonal extending transversely thereto (transverse direction or TD).

When producing net of said type in tubular form for use as a packaging net, it is common practice to rope-orientate the net.

In forming packaging sleeves from rope-orientated net of said type, certain difficulties arise. The rope-orientated net is transversely dimensionally unstable, tending to "rope" or "neck" to its minimum diameter. The net must therefore be opened out radially for use on a packaging machine feed tube, and accordingly when forming such nets into packaging sleeves it has been necessary to support the nets in an opened out condition by the use of hollow internal tubular formers made from cardboard, stiff paper or the like. Moreover, such nets do not lend themselves to highly concentrated axial bunching because of the relatively low helix angle of the net strands and the tendency of the net to contract radially.

Knitted net does not have the tendency to "rope" or "neck" and does lend itself to highly concentrated axial bunching because the intersections are not rigid and enable the crossing or intersecting strands to pivot with respect to each other. Thus, although knitted net is inherently more expensive than net of said type, knitted net has found much greater use in the past in producing tubular packages.

U.S. Pat. No. 3,370,116 discloses that tubular, plastic material net of said type can be transversely spread and heat set in this transversely spread condition, which will transversely open out the net. Such transversely opened out and heat set net would be more suitable for forming packaging sleeves than the mere rope-oriented net, but although the net would be more easily bunched axially because of the higher helix angle of the net strands, the net still would not lend itself to highly concentrated axial bunching. It will be noted that although the mandrel shown in the Patent Specification has a converging portion, the net is always under tension from the downstream nip rollers as it passes over the mandrel. Furthermore, it will be noted that although pleats or gussets can be formed, these pleats or gussets run in the machine direction.

German Patent Specification No. 1 173 236 discloses a somewhat similar arrangement, but in this case the rope-orientated net is transversely spread and is then pulled back into a rope of greater bulk which can be used as a yarn; the opened out tube is of relatively small diameter and the net has fine strands, making it normally unsuitable for packaging purposes. Although the mandrel does have a converging portion, the net is always under machine direction tension from the final reel.

German Patent Specification No. 1 303 765 is particularly concerned with a way of forming a tubular, plastics material net. Further, the Specification discloses that the net can be gathered over vertical formers and the drawings show that as the net passes down over the formers, it adopts a transversely corrugated configuration. It is believed that these corrugations will more resemble "bunching" (as defined hereinafter) and that highly concentrated axial bunching cannot occur because of the tendency of the net to spring back into its extended configuration.

The present invention provides a process as set forth in claims 1 and 4, apparatus as set forth in claim 5, and a plastics material net as set forth in claims 14 and 15.

The corrugations occur because the net is not under machine direction tension after being transversely opened out, and the corrugations give the net a bellows-like or concertina-like appearance. Subsequently, highly concentrated axial bunching of the net may be effected, for example for forming the net into a packaging sleeve, and this can be done by hand, at least partly.

By transversely opening out the rope-oriented net and heat-setting in accordance with the invention, the resulting net is found to possess a high degree of transverse dimensional stability so that effectively the tube does not tend to neck or radially contract into rope form as is the case with conventional rope-oriented nets, i.e. the bunched tubular sleeve has no substantial tendency to contract radially inwards into a rope form. Accordingly, the structure lends itself particularly for use in packaging sleeves which, due to the transverse stability of the net, can dispense with the need for an internal support to resist radial contraction. Further, due to the increase in mesh ratio (defined hereinafter) compared with conventional rope-orientated nets, the nets of the invention lend themselves to highly concentrated axial bunching, thus enabling packaging sleeves containing a greater overall length of net per unit length of sleeve to be produced than with previous rope-orientated nets. This effect is enhanced as the mesh ratio is increased, and ideally the mesh ratio should approach a value at which the net strands are substantially transverse. Thus, it is found that for a net produced in accordance with the invention, the structure can be axially bunched to such a degree that the resulting product length is 1/350th of its maximum axially-extended length (defined hereafter and referred to herein as "maximum extended length"). When the net strands approach more closely to a substantially transverse condition, the resulting net structure can by contrast be axially bunched down to a length which is 1/900th of the maximum extended length.

Though the invention could be applied to uni-planar nets, the invention is particularly useful when applied to bi-planar nets.

The following Table illustrates the effect on the reduction of ultimate sleeve length caused by opening out and setting bi-planar nets. Nets 2 to 5 of the Table have been treated in accordance with the invention, and all the nets are from the same rope-orientated starting product, namely net 1.

TABLE

| Net No. | Axial sleeve Length After Bunching/100 Meters Maximum Extended Length | Axial Length Reduction Ratio |
| --- | --- | --- |
| 1 | 38 cm | 263:1 |
| 2 | 28.6 cm | 350:1 |
| 3 | 21 cm | 477:1 |
| 4 | 15.3 cm | 656:1 |
| 5 | 11 cm | 900:1 |

The net of the invention in a highly concentrated axially-bunched form can be particularly suitable for forming packaging sleeves which are made from relatively light gauge rope-oriented nets, for instance nets having a weight of 4.5 to 14 gms/meter in their maximum extended length. In general, it is considered that nets having a weight of below 15 gms/meter in their maximum extended length are of light gauge and having a weight greater than 15 gms/meter are of heavy gauge. Products in such a highly concentrated axially-bunched form when made in accordance with the invention from heavier gauge rope-orientated nets (for instance having a weight around 50 to 60 gms/meter of their maximum extended length) also find application in other uses. For example packages of such nets when slit axially along the tube can be usefully employed as garden net (e.g. anti-bird net) when opened out and such packages can be produced in a more compact shape, due to the highly concentrated axial bunching of the net, than packages of the same overall net content produced from conventional rope-oriented nets.

BRIEF DESCRIPTION OF DRAWINGS

The invention will now be described, by way of example, with reference to the accompanying drawings, in which.

DEFINITIONS

Rope orientate: stretch the as cast net in the machine direction (termed in "rope form") in order to stretch and molecularly orientate the net strands. Rope orientating is well known and there is a description of it for instance in German Specification No. 1 173 236.

Figures 1, 2, 3:
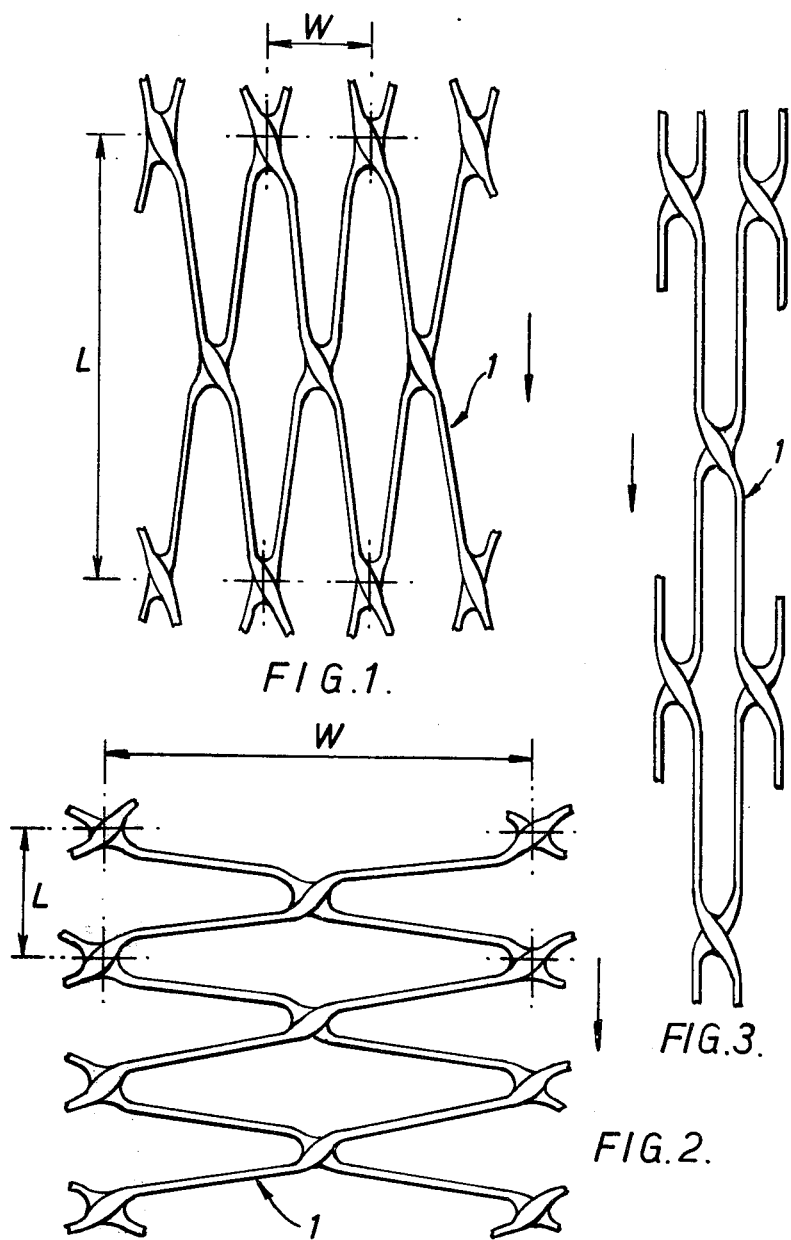
FIG. 1 is a view of a portion of a conventional form of rope-oriented net.
FIG. 2 is a view of a portion of net of the type shown in FIG. 1 after having been opened out and heat set in accordance with the invention.
FIG. 3 is a view of a portion of a conventional form of rope-oriented net, when stretched to its maximum axially-extended length.

Mesh ratio: the ratio of the distance between the centres of a pair of intersections measured in a transverse direction to that measured in the machine direction. In FIGS. 1 and 2 (where the machine direction is indicated by the arrow), the mesh ratio is W:L.

Maximum axially-extended length (maximum extended length): the distance between the centres of a pair of intersections measured in the machine direction when the net is not under sufficient axial tension to bring all the strands (except those portions of the strands immediately adjacent the intersections) substantially parallel with one another without substantially stretching the strands, though the intersections are somewhat distorted. This point is a point which can be identified as the tension is increased in order to elongate the net because it is found that after this point is reached, further increase in tension does not significantly decrease the transverse distances between the centres (see FIG. 3).

Figure 5:
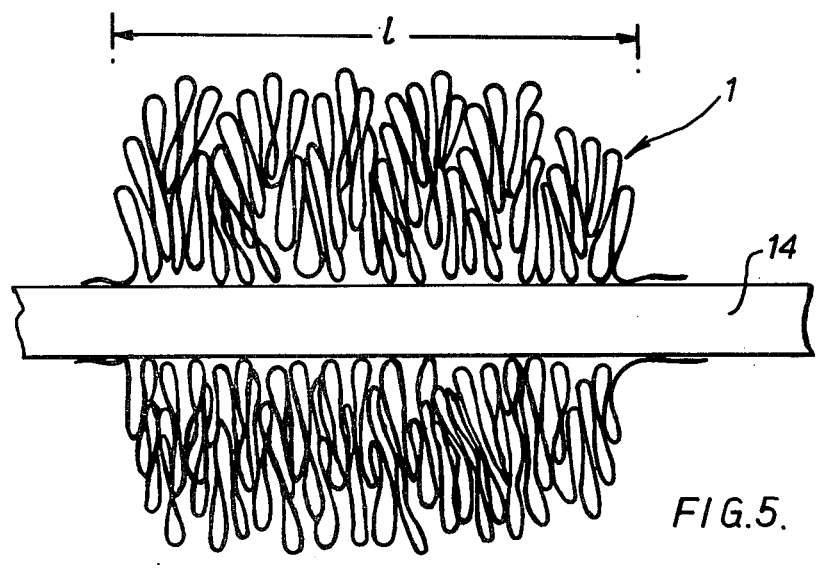
FIG. 5 is a longitudinal section through a corrugated and bunched net.

Bunching: dense layering or overlapping and backlapping of the net, with reverse folding (see FIG. 5).

Figure 7:
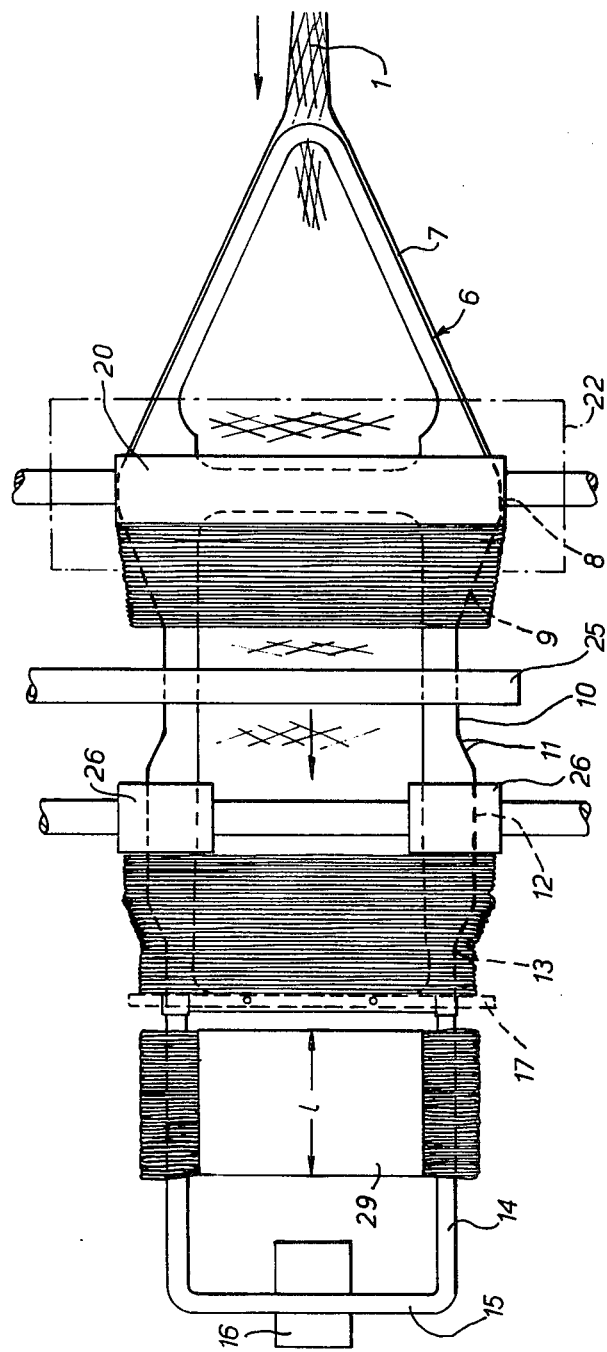

Length of a highly concentrated, axially-bunched net: the length of the mass (the length l in FIGS. 5 and 7 not the actual length of the net within the mass. The minimum length of an axially-bunched tubular net which has a hole down the middle is determinable because the net has a fixed circumference.

DETAILED DESCRIPTION OF AN EMBODIMENT OF THE INVENTION

Figure 6:
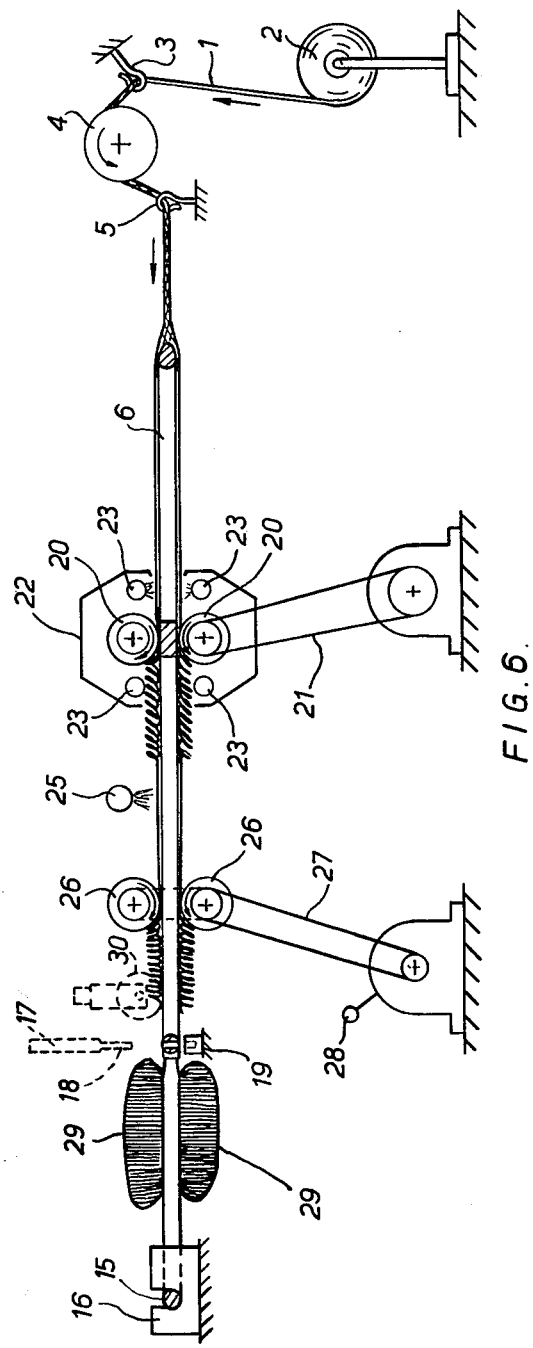
FIGS. 6 and 7 are respectively a vertical section and a plan view through an embodiment of apparatus in accordance with the invention.

As shown in FIG. 6, the rope-oriented net 1 of the kind illustrated in FIG. 1 is drawn off a reel 2 which can be swivelled about a vertical axis should the net begin to twist as it passes through the apparatus. The rope-oriented net of FIG. 1 was made for example by casting a tubular net by means of a process and apparatus as described in U.K. Pat. No. 836 555 and then stretching the as cast net into a rope form in the machine direction in a conventional manner, for example using differential speed draw rollers, to elongate and molecularly orientate the net strands. The net 1 is passed through an eye 3, over a count wheel 4, through another eye 5 and then over a mandrel 6. A suitable speed is around 100 meters per minute.

The mandrel 6 is in the form of a flat frame, preferably made of aluminum, its shape can be seen in FIG. 7. The mandrel has a first, diverging section 7, a very short substantially parallel-sided second section 8, a converging section 9, a parallel-sided section 10, a further diverging section 11 at the downstream end of which the circumference (or width) of the mandrel is less than at the end of the first diverging section 7, a further parallel-sided section 12, a further converging section 13, and a final, parallel-sided section or sleeve frame 14 which has a circumference (or width) substantially less than at the end of the first diverging section 7. The parallel-sided sections 8 and 12 need only be long enough for corrugations to form. Thus the section 8 could be about 2.5 cms long. The section 8 could have a circumference of about 75 cms. The inclination of the converging sections 9 and 13 should be suitable to allow the corrugations to pass along without the respective section 9 or 13 offering undue resistance, the inclination of the first converging section 9 being 22° in FIG. 7. The mandrel 6 terminates in a cross-bar 15 which engages in a slot in a block 16 which acts as a means for securing the downstream end portion of the final section 14 in position and thus holding back the mandrel 6 in operation. Most of the final section 14, in the form of a sleeve frame, can be slid out from the remainder of the mandrel 6 after being released from the block 16, and a stop plate 17 is provided having pins 18 which pass down through holes in the mandrel 6 and engage in holes in fixed blocks 19 to act as alternative securing means for securing the upstream portion of the mandrel 6 in position.

The net is drawn over the first diverging section 7 by driving means in the form of pair of rolls 20 extending right across the mandrel 6 and positioned on either side of the mandrel 6. The first rolls 20 are arranged to apply relatively low pressure to the net 1, and themselves can have a covering of highly abrasive resistant rubber. In FIG. 7 the closest point of the rolls 20 is precisely at the junction between the diverging section 7 and the parallel-sided section 8, though alternatively the rolls 20 could be slightly downstream of the beginning of the parallel-sided section 10. A drive arrangement 21 for the rolls 20 is schematically indicated in FIG. 6.

Figure 4:
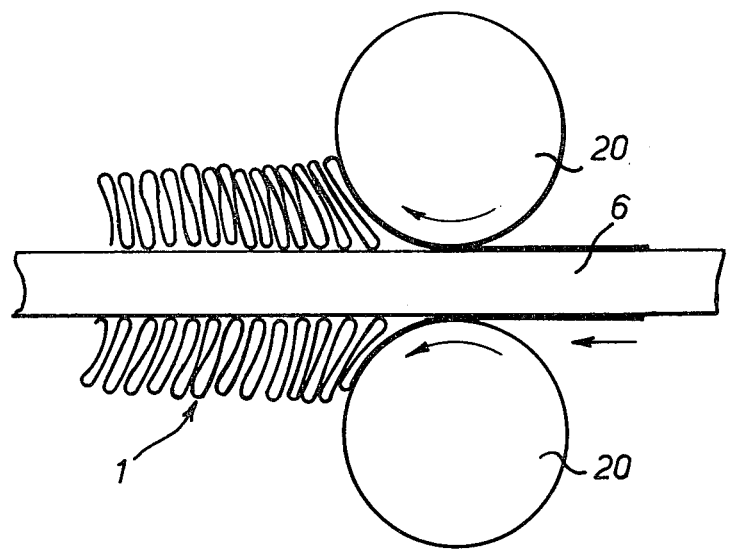
FIG. 4 is a longitudinal section through a corrugated net.

The net 1 is in both MD and TD tension as it passes over the diverging section 7, and the mesh pattern changes from a long machine direction diamond (as in FIG. 1) at the nose of the diverging section 7 to a short machine direction diamond (as in FIG. 2) at the end of the diverging section 7; at the end of the diverging section 7, the net strands can be nearly transverse as a mere transverse opening-out occurs without stretching the net strands, so that the TD force required is not large and hence the MD force is not large. After passing under the rolls 20, the net 1 is no longer in MD tension though still in TD tension, and is thus pushed along and forms transverse corrugations on the parallel-sided section 8 (as shown in FIG. 4); the corrugated net 1 passes down the converging section 9. Thus the diverging section 7 acts as a means for transversely opening out the net 1 and the rolls 20 and the parallel-sided section 8 as means for corrugating the transversely opened-out net 1 so that the corrugations run transversely.

Heat-setting means for heat setting the net 1 in its transversely opened-out and corrugated state is provided in the form of a steam cabinet 22, supplied by steam pipes 23. The heat set the net 1, it is heated up to a temperature normally in the range of 60° to 100° C. depending on the resin from which the net is made, and then cooled. During heat setting, some shrinkage occurs, which increases the grip of the net 1 on the parallel-sided section 8 and thus increases the corrugation-forming propensity of the mandrel 6. As the net 1 is relatively fast moving, the steam chamber 22 begins before the rolls 20 to allow a very short time to heat through the centre of the strands of the net. However, the heat setting could begin after the corrugations have been formed. Furthermore, the steam cabinet 22 could be replaced by hot water spray pipes 24 or indeed by means of applying any suitable hot medium to the net 1.

The cooling of the net 1 can be natural, but preferably forced cooling is carried out with a liquid or forced gas coolant supplied through a coolant pipe or pipes 25, the preferred coolant being compressed air. As shown in FIGS. 6 and 7, the net 1 is preferably subjected to MD tension after heat setting so that it can be fully dried, the MD tension then being discontinued so that the corrugations already heat set into the net 1 reappear. The MD tension applying means are second rolls 26 (which can be just at the sides of the net 1) driven by a suitable drive arrangement 27 which is indicated schematically in FIG. 6. The drive arrangement 27 is provided with a speed control (schematically indicated at 28), and the rolls 26 are driven at such a speed that say 10 to 15 millimeters of corrugated net 1 are visible at the output end of the steam cabinet 22, thereafter the net 1 being in tension and no longer corrugated on the parallel-sided section 10, being opened out slightly over the diverging section 11 and being engaged by the rolls 26 on the parallel-sided section 12 to allow and positively assist the corrugations to reform, the net 1 then passing over the converging section 13 and on to the final section 14.

On the final section 14, the net forms a loose bunch, and at a moment indicated by the count wheel 4, an operator cuts the net at the upstream end of the final section 14, inserts the stop plate 17, pushes the net on the final section 14 together to form a highly concentrated axially-bunched net as illustrated in FIG. 5, and secures the sleeve so formed by means of paper bands 29 or ties or any other suitable securing means. The cross-bar 15 is then lifted out of the block 16 and the sleeve frame is pulled out of the remainder of the mandrel 6, the sleeve is discharged, the sleeve frame is reinserted, the cross-bar is re-engaged with the block 16 and the stop plate 17 is lifted out to continue with the next cycle.

As an alternative, the corrugated net 1 could be continuously slit by means of a rotary textile cutter schematically indicated as 30 in FIG. 6, for sale as for instance antibird netting after highly concentrated axial bunching.

In the embodiments of FIGS. 6 and 7, the degree of corrugation is a function of the frictional resistance to travel of the net 1 along the parallel-sided section 8, which in turn is a function both of the ratio of the maximum circumference of the net 1 to the circumference of the section 8 and of the degree of shrinkage of the net 1 which takes place during heat setting; the maximum circumference of the net 1 is the maximum circumference to which it can be transversely opened out without stretching or molecularly orientating the strands, and is preferably just slightly greater than the circumference of the section 8. Although it is desirable and convenient to have the section 8 precisely parallel-sided, in substantial non-parallelism, for example a convergence of 1° of each side relative to the axis of the mandrel 6, is tolerable. If required, the frictional resistance on the net 1 can be increased for example by the use of static brushes or the like (not illustrated) brushing against the inside or the outside of the net 1. In one example, the trough-to-crest height of the corrugations was about 1.25 cms. with about 2.5 cms. of net 1 between each crest.

The converging section 9 is desirable because it reduces the force which must be applied to the net 1 by the rolls 20, and thus reduces the risk of the rolls 20 tearing the net 1. The converging section 13 is desirable for a similar reason.

I claim:

1. A process for forming a net, comprising: providing a tubular, plastic material net having two sets of strands joined together by tenacious intersections, each set extending at an angle to the other set and at an oblique angle to the machine and transverse directions;
   rope orientating the net;
   transversely opening out the net;
   forming axially spaced transversely extending corrugations in the transversely opened-out net;
   heat setting the net in its transversely opened-out andcurrugated state; and
   subsequently subjecting the net to highly concentrated axial bunching.

2. The process of claim 1, in which the net is transversely opened out into a state in which the mesh ratio approaches a value at which the net strands are substantially transverse.

3. The process of claim 1, wherein the transversely opened-out and corrugated net is subjected to machine direction tension, and the machine direction tension is discontinued so that the corrugations already heat-set into the net reappear.

4. A process for forming a net, comprising: extruding a tubular, bi-planar, plastics material net having a first set of strands in one plane and a second set of strands in an adjacent, parallel plane, the first set of strands extending at an angle to the second set of strands and both sets of strands extending at an oblique angle to the machine and transverse directions, the sets of strands being joined together by tenacious intersections;
   rope orientating the net;
   transversely opening out the net into a state in which the net strands are nearly transverse without substantially stretching the net;
   applying only transverse direction tension to the transversely opened-out net and pushing the net to form axially spaced transversely extending corrugations in the net;
   heat setting the net in its transversely opened-out and corrugated state; and
   subsequently subjecting the net to highly concentrated axial bunching.

5. An annular sleeve of plastics material net which has been formed by rope-orientating a tubular mesh structure comprising two sets of strands joined together by tenacious intersections, each set extending at an angle to the other set and at an oblique angle to the machine and transverse directions, and subsequently heat setting the rope-oriented net in a transversely opened-out and axially spaced corrugated state with the corrugations running transversely, the net being in a highly concentrated, axially-bunched condition, having a length less than 1/350th of its maximum axially-extended length, and having no substantial tendency to contract radially inwards into a rope form.

6. A plastic material net which has been formed by rope-orientating a tubular mesh structure comprising two sets of strands joined together by tenacious intersections, each set extending at an angle to the other set and at an oblique angle to the machine and transverse directions, subsequently heat setting the rope-oriented net in a transversely opened-out and axially spaced corrugated state with the corrugations running transversely, and slitting the net, the net being in a highly concentrated, axially-bunched condition and having a length less than 1/350th of its maximum axially-extended length.

7. The process of claim 1, wherein the net is provided by extruding a tubular, bi-planar, plastics material net having a first set of strands in one plane and a second set of strands in an adjacent, parallel plane, and wherein the net is transversely opened out by being opened out into a state in which the net strands are nearly transverse without substantially stretching the net, and wherein the net is transversely corrugated by applying only transverse direction tension to the transversely opened-out net and pushing the net.

8. An annular sleeve of plastics material net comprising a rope-oriented tubular mesh structure having two sets of strands joined together by tenacious intersections, the net being set in a condition in which the strands of each set extend substantially transversely of the tube axis, and in which axially spaced transversely extending corrugations are formed in the net, the net further being in a highly concentrated axially bunched condition having a length less than 1/350th of its maximum axially-extended length.

* * * * *